United States Patent [19]

McCabe, Jr.

[11] 4,124,116
[45] Nov. 7, 1978

[54] LIQUID ABSORBING SECTIONAL PACK

[76] Inventor: Edward G. McCabe, Jr., 951 Wellesley Rd., Pittsburgh, Pa. 15206

[21] Appl. No.: 872,340

[22] Filed: Jan. 25, 1978

Related U.S. Application Data

[63] Continuation-in-part of Ser. No. 768,844, Feb. 15, 1977, abandoned.

[51] Int. Cl.$^2$ ................ B65D 81/26; F17C 11/00
[52] U.S. Cl. ........................... 206/204; 34/95; 55/384; 55/387; 162/158; 206/484.1; 206/524.6; 210/502; 210/DIG. 6; 229/56
[58] Field of Search ............ 206/204, 484.1, 524.5; 162/158; 428/306; 229/56; 210/DIG. 6, 502, 488; 55/384, 387, 388, 512, 515; 34/95; 260/17.4

[56] References Cited

U.S. PATENT DOCUMENTS

| | | | |
|---|---|---|---|
| 2,545,710 | 3/1961 | Snyder | 206/204 |
| 2,578,324 | 12/1951 | Southwick | 206/204 |
| 2,713,214 | 7/1955 | Gulaskie | 34/95 |
| 3,034,922 | 5/1962 | Boe et al. | 162/158 |
| 3,661,815 | 5/1972 | Smeith | 260/17.4 |
| 3,990,872 | 11/1976 | Cullen | 206/204 |

*Primary Examiner*—Frank Sever
*Attorney, Agent, or Firm*—Stanley J. Price, Jr.; John M. Adams

[57] ABSTRACT

Upper and lower contiguous filter sheets are bonded to each other at the outermost contiguous edges thereof to form an enclosure. The enclosure is divided into a plurality of sectional compartments which are isolated from each other by dissolving barrier sheets. The dissolving barrier sheets consist essentially of a water soluble carboxy methyl cellulose compound. Each of the sectional compartments contain a predetermined quantity of absorbent granules. The barrier sheets function to dissolve when the granules have absorbed a predetermined amount of moisture so as to provide for increased space in which to contain moist granules.

6 Claims, 2 Drawing Figures

LIQUID ABSORBING SECTIONAL PACK

CROSS-REFERENCE TO RELATED APPLICATION

This application is a continuation-in-part of U.S. application Ser. No. 768,844, entitled "Liquid Absorbing Sectional Pack", which was filed in the United States Patent and Trademark Office on Feb. 15, 1977 now abandoned.

BACKGROUND OF THE INVENTION

1. Field of the Invention

This invention relates to a moisture absorption pack and more particularly to a liquid absorbing sectional pack operable in a variety of environments to prevent the accumulation of liquids.

2. Description of the Prior Art

Desiccant containers operable to absorb water vapor, liquids and the like are well known in the art as disclosed in U.S. Pat. No. 2,578,324 which teaches a package made of water vapor permeable sheets of fibrous material with a heat-sealable coating on one surface of the fibrous sheet. A fibrous material, such as tissue paper, is embedded in the coating. The sheets are arranged into a container and a desiccant, such as silica gel, is sealed in the container whereby water vapor is readily absorbed through the walls of the container. The volume of water vapor capable of being absorbed is determined by the absorbent capacity of the volume of desiccant in the container. Once this capacity has been exceeded, however, the container is not operable to absorb additional water vapor to which it is exposed.

It is known, as disclosed in U.S. Pat. No. 2,713,214, to reduce perspiration of the feet when worn in a shoe by a shoe pad formed by a plurality of individually sealed pockets containing a foot powder. The pad is positioned in the shoe, and the pad follows the contour of the inner shoe. The pad when worn in the shoe functions to remove foot odor and reduce perspiration of the feet.

Substances capable of absorbing relatively large amounts of fluids are used in manufacturing products of the above described type to increase the water absorbency of the products. U.S. Pat. No. 3,611,815 discloses a water insoluble granular solid comprising an alkali metal carboxylate salt of a starch-polyacrylonitrile graft copolymers. The granular solids have the ability to absorb water in amounts in excess of 50 parts per part thereof while retaining their granular character. The granules, as disclosed, are useful in the manufacture of liquid absorbing products.

While it has been suggested by the prior art to provide liquid absorbing devices in which a desiccant is retained in a liquid or moisture permeable sheet material, the absorbent properties of the known devices are limited by the quantity of liquid or moisture the container and desiccant are capable of absorbing. Thus for a device having sealed sections with a fixed volume of desiccant in each section, the absorbent capacity of the entire device is limited by the capacity of each section. Thus, unless the remaining sections are exposed to the liquid or moisture, the entire device is limited to the absorbent capabilities of one section. Therefore, there is need to provide a liquid or moisture absorbing device containing a plurality of sections in which all the liquid entering an individual section will be absorbed by the section of the device even though the amount of liquid entering the individual section is greater than the absorbent capabilities of the individual section.

SUMMARY OF THE INVENTION

In accordance with the present invention there is provided a liquid absorbent sectional pack that includes upper and lower contiguous filter sheets which are bonded to each other at the outermost contiguous edges thereof to form an enclosure. The enclosure is divided into a plurality of sectional compartments which are isolated from each other by dissolving barrier sheets. The dissolving barrier sheets consist essentially of a water soluble carboxy methyl cellulose compound. Each of the sectional compartments contain a predetermined quantity of absorbent granules. The barrier sheets function to dissolve when the granules have absorbed a predetermined amount of moisture so as to provide for increased space in which to contain moist granules.

The liquid absorbing sectional pack of the present invention can be used in any type or size container or enclosure where the presence of moisture or liquid is a problem. For example, the liquid absorbing sectional pack can be used with containers and enclosures such as optical lens cases, burial caskets, storage rooms, railroad cars, and any other type of container or enclosure that must remain free of moisture and/or liquid. The liquid absorbing sectional pack of the present invention is particularly adapted for use as a drying agent in the storage of furniture or the storage of any other material where it is essential that the material remain dry.

In a preferred embodiment of the present invention the liquid absorbing sectional pack includes a filter material such as a filter paper which is sealed around the outermost edges thereof to a dissolving material. The dissolving material is preferably a dissolving paper. Accordingly, a plurality of individual enclosures or sections are formed by the filter paper and dissolving paper. Each sectional compartment is provided with a plurality of liquid absorbent granules, such as alkali metal carboxylate salts of starch-polyacrylonitrile graft copolymers as described in U.S. Pat. No. 3,661,815 referred to above.

The amount of absorbent granules in each section and the size of each section depends on the amount of liquid to be absorbed by the plurality of sections forming the sectional pack. For example, a sectional pack having 20 sections or compartments would include 1/20th of 1 pound of liquid absorbing granules in each section. Thus a 20 section liquid absorbing sectional pack would contain a total of 1 pound of liquid absorbing granules and would be capable of absorbing a total of 50 pounds of liquid. Each section or compartment holds the same amount of absorbent granules so that each section of the pack has the same liquid absorbing properties regardless of the position of the pack in use because the absorbent granules are confined to the respective sections. This permits the sectional pack to be placed in any desired environment and in any desired position such as parallel, perpendicular or at an angle to its supporting surface.

In one embodiment the pack is formed by an upper and lower contiguous filter sheets which are bonded to each other at their outermost contiguous edges to form an enclosure which is, in turn, divided into a plurality of sectional compartments isolated from one another by dissolving paper. The absorbent granules are contained in each sectional compartment. In the presence of moisture and/or liquid, the dissolving paper dissolves so as to release the absorbent granules from each compartment. While the absorbent granules are released from the compartments they are retained in the pack formed by the upper and lower filter sheets.

In another embodiment the absorption pack is formed by a sheet of filter paper and a sheet of dissolving paper. The sheets are bonded together to form a plurality of sectional compartments isolated from one another and containing the absorbent granules. In the presence of moisture the dissolving paper rapidly dissolves or breaks down so as to permit the absorbent granules to escape from the sectional compartments and be completely released from the pack. With this arrangement the granules are deposited on the surface of the object supporting the absorption pack.

These and other objects of the present invention will be more completely disclosed and described in the following specification, the accompanying drawings and the appended claims.

DESCRIPTION OF THE PREFERRED EMBODIMENTS

Figure 1:
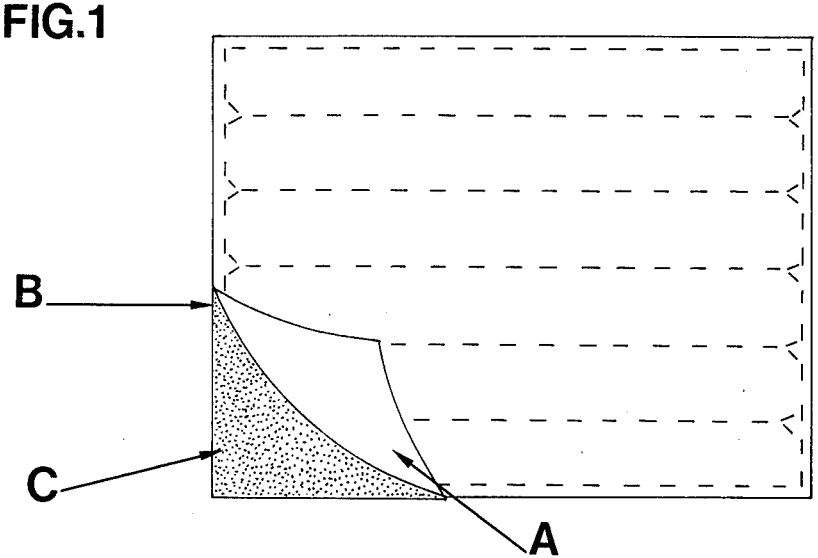
FIG. 1 is a plan view, partially cut away, of an individual sectional compartment of the absorption pack of the present invention, illustrating an upper sheet of filter paper bonded at its outermost edges to a sheet of dissolving paper to form an individual compartment containing a quantity of absorbent granules.

Referring to FIG. 1 there is illustrated an absorption pack forming a single sectional compartment by a sheet of filter paper A bonded at the outermost edges thereof to a sheet of dissolving paper B. For purposes of illustration the sheet of filter paper A is cut away to illustrate the quantity of absorbent granules C contained within the compartment formed by the sheet of filter paper A and the sheet of dissolving paper B. The compartment is filled with the granules C, and the sheets are sealed in a conventional manner as known to those skilled in the art of filling and sealing machinery.

Figure 2:
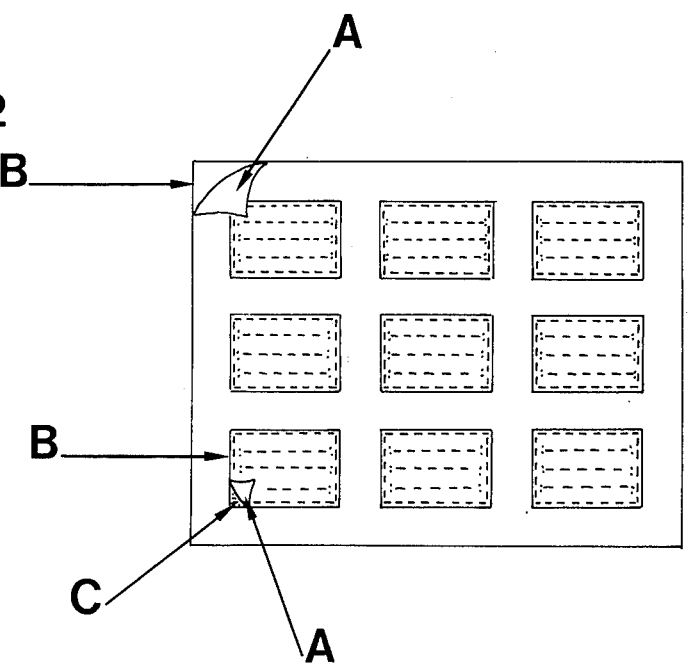
FIG. 2 is a plan view, partially cut away, of the absorption pack of the present invention, illustrating a plurality of sectional compartments divided by the dissolving paper and containing a quantity of the absorbent granules.

In FIG. 2 an absorption pack is illustrated that includes a plurality of sectional compartments formed by the arrangement in FIG. 1. With this arrangement an upper sheet of filter paper A is positioned in overlying relation with a lower sheet of dissolving paper B. The upper and lower sheets A and B are bonded to each other in a conventionally known manner to form a plurality of sectional compartments that are isolated from each other. A predetermined quantity of absorbent granules C is contained in each compartment. The manner of assembling the pack to form the individual sealed compartments and the manner of filling each compartment with a predetermined quantity of absorbent granules will be apparent to those skilled in the art.

The filter paper A utilized in the present invention is a high wet-strength paper that allows liquid to pass through the paper at a desired rate of flow, while maintaining the sheet web integrity. The dissolving paper utilized in the present invention is constructed of water soluble film formers consisting essentially of a water soluble carboxy methyl cellulose or methocel compound. The dissolving paper is basically a carboxy methyl cellulose compound containing a small amount of inert filler, titanium oxide and some cotton and rayon fibers. These materials are included in the carboxy methyl cellulose compound to provide the finished product with the appearance and feel of paper and the tearing ability of paper. The carboxy methyl cellulose compound is very soluble in water and will dissolve readily with only a slight residue of fillers and fibers.

With the arrangement illustrated in FIG. 2, moisture, water vapor and/or liquid passes through the sheet of filter paper A and is absorbed by the absorbent granules in the sectional compartments. Simultaneously the liquid to be absorbed passes through the sheet of filter paper A into contact with the absorbent granules C and through the sheet of filter paper A between the compartments to the sheet of dissolving paper B. The dissolving paper B dissolves upon contact with the liquid. The absorption pack is also operable to permit liquid to pass directly through the sheet of dissolving paper B and into the sectional components and into contact with the absorbent granules C.

Dissolving of the dissolving paper B permits the granules C to escape from their respective compartments. The granules C when exposed to moisture, water vapor, liquid and the like swell to absorb and hold the absorbed substance. At this state it is no longer desirable to retain the absorbent granules C in their respective sectional compartments because the granules in a particular section have absorbed the maximum amount of moisture they are capable of absorbing. Thus, as moisture comes in contact with the dissolving paper B of other sectional compartments, the dissolving paper B breaks down to free the granules from the compartments. In this manner additional absorbent granules are provided for absorbing the excess moisture beyond which the granules of any one compartment are capable of absorbing. Consequently, all of the granules C contained in the enclosure formed by the sheet of filter paper A and the sheet of dissolving paper B are released for operation in the total absorption of the moisture.

The introduction of moisture and/or liquid into contact with the absorption pack either through the sheet of filter paper A or through the sheet of dissolving paper B results in the disintegration of the respective sectional compartments due to the rapid breakdown in approximately three to ten seconds of the dissolving paper B. However, the filter paper A is liquid permeable and remains intact. Thus, the sectional compartments are broken but the pack remains sealed to provide a compartment of increased space in the enclosure in which to contain an increased number of absorbent granules C. Even though the amount of liquid and/or moisture entering a particular sectional compartment is greater than the amount of moisture that the granules in that particular compartment are capable of absorbing, the excess moisture is continually being absorbed by the addition of absorbent granules to that particular compartment from adjacent compartments that have been opened by the breakdown of the dissolving paper B.

For example, with an absorption pack having a plurality of sectional compartments each containing the same quantity of absorbent granules C, each compartment is operable to absorb equal amounts of moisture and/or liquid. Thus if each compartment is capable of absorbing 1 pound of liquid, and if 5 pounds of liquid are exposed to one compartment, then the granules C in that compartment will absorb 1 pound of liquid. The remaining 4 pounds of liquid enter the compartment and are absorbed by the addition of other granules which are released from adjacent compartments upon dissolving of the dissolving paper B. Thus, the entire 5 pounds of liquid are absorbed by the absorption pack 5 even though all the liquid has entered the pack through one sectional compartment which contains only sufficient absorbent granules to absorb one pound of liquid. However, due to the rapid breakdown of the dissolving paper comprising the absorption pack, adjacent compartments are broken and an increased space is provided for additional absorbent granules to be brought into contact with the excess moisture. By the rapid breakdown of the dissolving paper B the excess liquid is absorbed by the addition of absorbent granules from surrounding compartments to the granules of the one compartment through which the liquid has entered the pack.

With the embodiment illustrated in FIGS. 1 and 2 after the dissolving paper B of all the sectional compartments dissolves, all the granules within the absorption pack are released from the pack and are deposited upon the surface of the object supporting the pack. For example, if the absorption pack of FIG. 2 is positioned on the floor of a storage container, breakdown of the dissolving paper B of the pack would release the granules contained in the entire enclosure formed by the sheet of filter paper A and the sheet of absorbing paper B. The granules would be deposited on the surface of the storage case supporting the absorption pack.

In accordance with another embodiment of the present invention, upper and lower contiguous sheets of filter paper A are bonded to each other at the outermost contiguous edges thereof to form an enclosure. The enclosure is divided into a plurality of sectional compartments which are isolated from one another by a dissolving barrier formed by a sheet of dissolving paper B having the above-identified composition. Each sectional compartment contains a predetermined quantity of absorbent granules C. The barrier formed by the sheet of dissolving paper B functions to dissolve when exposed to moisture so that the absorbent granules C in each compartment absorb a predetermined amount of moisture.

As the barrier formed by the sheet of paper B dissolves the respective compartments are broken from their initial sealed condition. This increases the space within the enclosure for additional absorbent granules C to be supplied to the absorbent granules C of a particular compartment which has absorbed all the moisture it is capable of absorbing. Thus with this embodiment, as distinguished from the previously described embodiment, the absorbent granules C are not released from the absorption pack upon dissolving of the dissolving paper, but are retained in the enclosure provided by the upper and lower contiguous sheets of filter paper A. As stated the upper and lower sheets of filter paper A are bonded to each other at the outermost contiguous edges thereof. The filter paper A maintains its sheet web integrity preventing the absorbent granules C from being released from the absorption pack.

According to the provisions of the patent statutes, I have explained the principle, preferred construction and mode of operation of my invention and have illustrated and described what I now consider to represent its best embodiments. However, it should be understood, that within the scope of the appended claims, the invention may be practiced otherwise than as specifically illustrated and described.

I claim:

1. A moisture absorption pack comprising,
   upper and lower contiguous sheet means bonded to each other at the outer most contiguous edges thereof to form an enclosure, at least one of said means being filter sheet means,
   said enclosure being divided into a plurality of sectional compartments which are isolated from each other by dissolving barrier means,
   said dissolving barrier means consisting essentially of a water soluble carboxy metal cellulose compound,
   said sectional compartments each containing a predetermined quantity of absorbent granules, and
   said barrier means functioning to dissolve when said granules have absorbed a predetermined amount of moisture so as to provide for an increased space in which to contain moist granules.

2. A moisture absorption pack as set forth in claim 1 which includes,
   said absorbent granules consisting essentially of alkali metal carboxylate salt of starch-polyacrylonitrile graft copolymers.

3. A moisture absorption pack as set forth in claim 1 in which said barrier means includes,
   a sheet of dissolving paper bonded to said filter sheet means, and
   said sheet of dissolving paper being operable to dissolve in the presence of moisture to permit said sectional compartments to break open so that said absorbent granules are free to escape from said respective sectional compartments and be contained within said enclosure.

4. A moisture absorption pack as set forth in claim 1 which includes,
   said barrier means being operable in the presence of moisture to dissolve before moisture comes in contact with said filter sheet means to permit moisture to enter said sectional compartments through said barrier means.

5. A moisture absorption pack as set forth in claim 1 which includes,
   said sectional compartments being operable by the flow of moisture through said filter sheet means and said barrier means to disintegrate and thereby permit said absorbent granules to escape from said respective sectional compartments to absorb and retain all the moisture introduced into said absorption pack.

6. A moisture absorption pack as set forth in claim 1 which includes,
   both said upper and lower contiguous sheet means being filter sheet means.

* * * * *